UNITED STATES PATENT OFFICE.

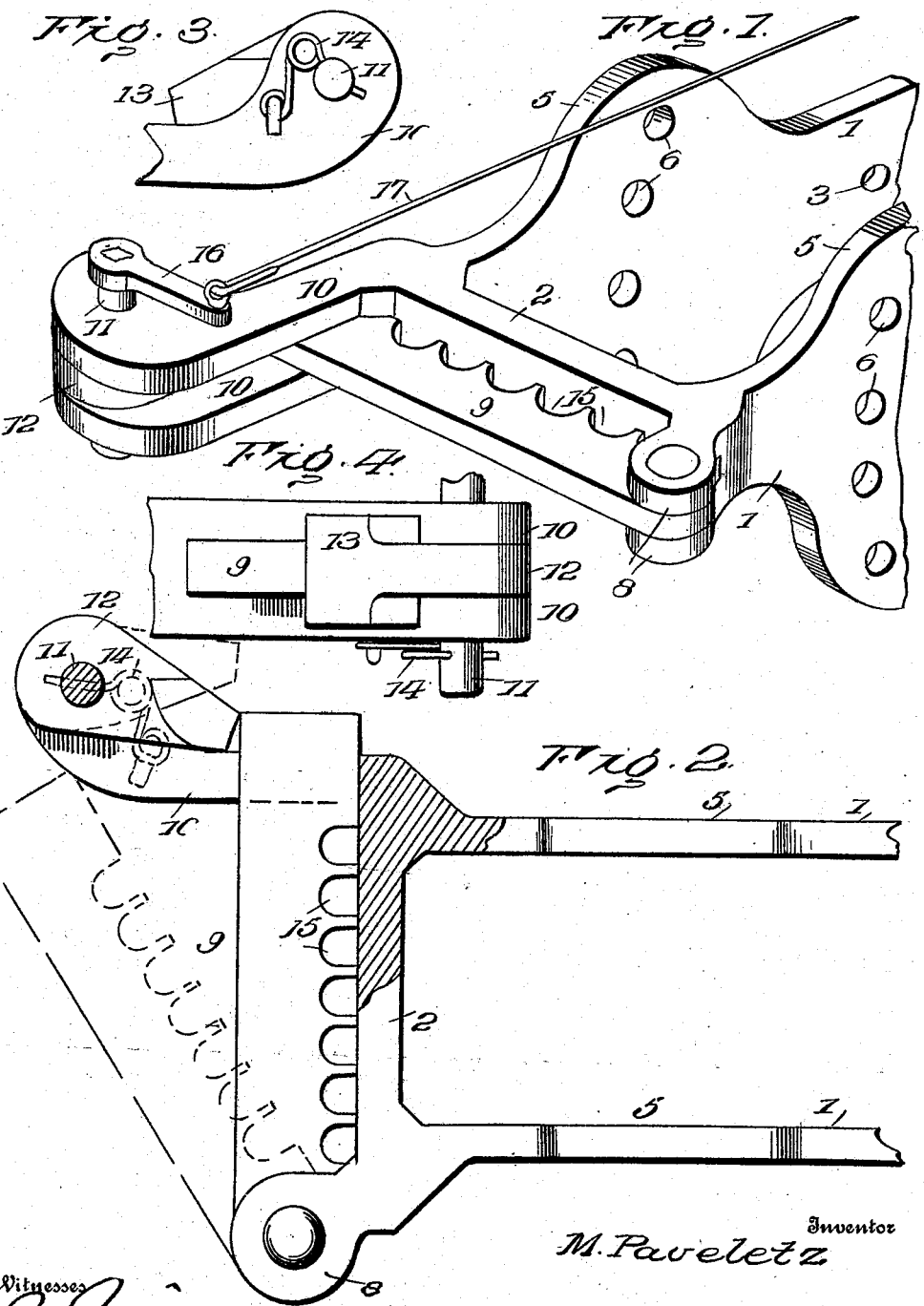

MATHIAS PAVELETZ, OF CANBY, OREGON.

CLEVIS.

No. 905,223.    Specification of Letters Patent.    Patented Dec. 1, 1908.

Application filed April 22, 1908. Serial No. 428,605.

*To all whom it may concern:*

Be it known that I, MATHIAS PAVELETZ, a citizen of the United States, residing at Canby, in the county of Clackamas and State of Oregon, have invented certain new and useful Improvements in Clevises, of which the following is a specification.

The object of this invention is an improved clevis which embodies primarily, peculiar means whereby the draft appliances may be quickly and positively released, as is desirable in the event of the horse running away or otherwise becoming unmanageable.

With this and other objects in view that will more fully appear as the description proceeds, the invention consists in certain construction and arrangements of the parts that I shall hereinafter fully describe, and then point out the novel features thereof, in the appended claim.

For a full understanding of the invention and the merits thereof, and to acquire a knowledge of the details of construction, reference is to be had to the following description and accompanying drawing, in which:

Figure 1 is a perspective view of my improved clevis; Fig. 2 is a plan view thereof, partly broken away; Fig. 3 is a detail view showing the connection between the spring and the shaft; and, Fig. 4 is a side elevation of a portion of the clevis, showing the keeper in an operative position.

Corresponding and like parts are referred to in the following description and indicated in all the views of the drawing, by the same reference characters.

My improved clevis embodies a frame which is preferably cast or otherwise formed of an integral piece of metal, and which is designed to embrace the forward end of a plow beam or the like, said frame consisting of two side plates 1 which extend rearwardly along the vertical sides of the plow beam, and a cross piece 2 rigidly connecting the side plates at their forward ends. The side plates are formed at their rear ends with openings 3 extending therethrough to accommodate a bolt which passes through the same and through the plow beam to pivotally connect the clevis to the latter. The side plates 1 are preferably vertically enlarged intermediate of their ends, as indicated at 5, and are formed in such enlarged portions with a corresponding series of apertures 6 that extend in the form of arcs of circles, of which the openings 3 are the centers, a pin passing through the plow beam and any selected pair of alining apertures 6, to sustain the clevis in the desired vertically adjusted position.

The cross piece 2 is formed at one end with two forwardly disposed spaced lugs 8 between which a draft bar 9 is pivotally secured at one end so as to swing about a vertical axis, the other, or swinging end of the draft bar normally extending between and projecting outwardly beyond two vertically spaced ears 10 which project forwardly from the other end of the cross piece, said ears being laterally enlarged at their forward ends, as shown. A shaft 11 is journaled in the forward ends of the ears, and carries a keeper 12 which is rigidly mounted at one end upon the shaft between the spaced ears 10, and the other or free end of which is preferably vertically enlarged, as indicated at 13. A coil spring 14 is secured to one of the ears 10 and to the shaft 11, and exerts its tension upon the shaft so as to turn the same in a direction to move the keeper 12 inwardly and hold the enlarged end 13 thereof against the outer edges of the ears, in which position the keeper forms an abutment for the outwardly projecting end of the draft bar 9 to hold the same in position, with its rear edge against the cross piece 2. The rear edge of the draft bar is formed with a series of recesses 15, any selected one of which is designed to accommodate the draft link and retain the same securely to the clevis, different lateral adjustments of the draft link being effected by shifting the same into various recesses.

In order to release the draft appliances, the shaft 11 is formed at one end with an inwardly projecting crank arm 16, to the end of which is secured a flexible trip member 17 that extends rearwardly to a point where it may be conveniently grasped by the driver. Any tension exerted upon the trip member, obviously turns the shaft 11 against the force of the spring 14, and moves the enlarged end 13 of the keeper outwardly, whereby to permit the swinging end of the draft bar to be drawn forwardly between the vertically spaced ears, and thus quickly and positively release the draft appliances.

While my improved clevis has been described and shown in connection with a plow, it is to be understood that it may be advantageously employed in connection with agricultural implements generally, or with carriages or wagons or the like.

From the above description, in connection with the accompanying drawing, it will be apparent that I have provided a simple, durable and efficient construction of clevis which may be conveniently operated to positively and quickly release the draft appliances, and which consists of comparatively few parts that may be easily and cheaply manufactured and readily assembled.

Having thus described the invention, what I claim is:

A clevis embodying a cross piece formed at one end with spaced ears, a draft bar pivotally connected at one end to the other end of the cross piece with its free end extending between the ears and projecting outwardly beyond the same in the operative position of the draft bar, a shaft journaled in the ears with its ends projecting therebeyond, a keeper 12 rigidly mounted upon the shaft between the ears and formed with an enlarged portion 13, a spring secured to one end of the shaft and exerting a tension upon the same to hold the enlarged end of the keeper against the outer edges of the ears and in a position to constitute an abutment for the projecting end of the draft bar, a crank arm rigidly secured to the other end of the shaft, and a trip member connected to said crank arm and arranged to be pulled to rotate the shaft against the tension of the spring and swing the enlarged end 13 of the keeper out of operative relation to the corresponding end of the draft bar.

In testimony whereof I affix my signature in presence of two witnesses.

MATHIAS PAVELETZ. [L. S.]

Witnesses:
 J. L. ECKERSON,
 JOHN BARRY.